(No Model.) 5 Sheets—Sheet 1.
T. A. BRIGGS.
CUTTER FOR LABEL MACHINES.

No. 262,731. Patented Aug. 15, 1882.

WITNESSES
Charles C. Stetson
B. E. D. Stafford

INVENTOR
Thomas A. Briggs
by his attorney
Thomas D. Stetson (No Model.)  5 Sheets—Sheet 2.

T. A. BRIGGS.
CUTTER FOR LABEL MACHINES.

No. 262,731.  Patented Aug. 15, 1882.

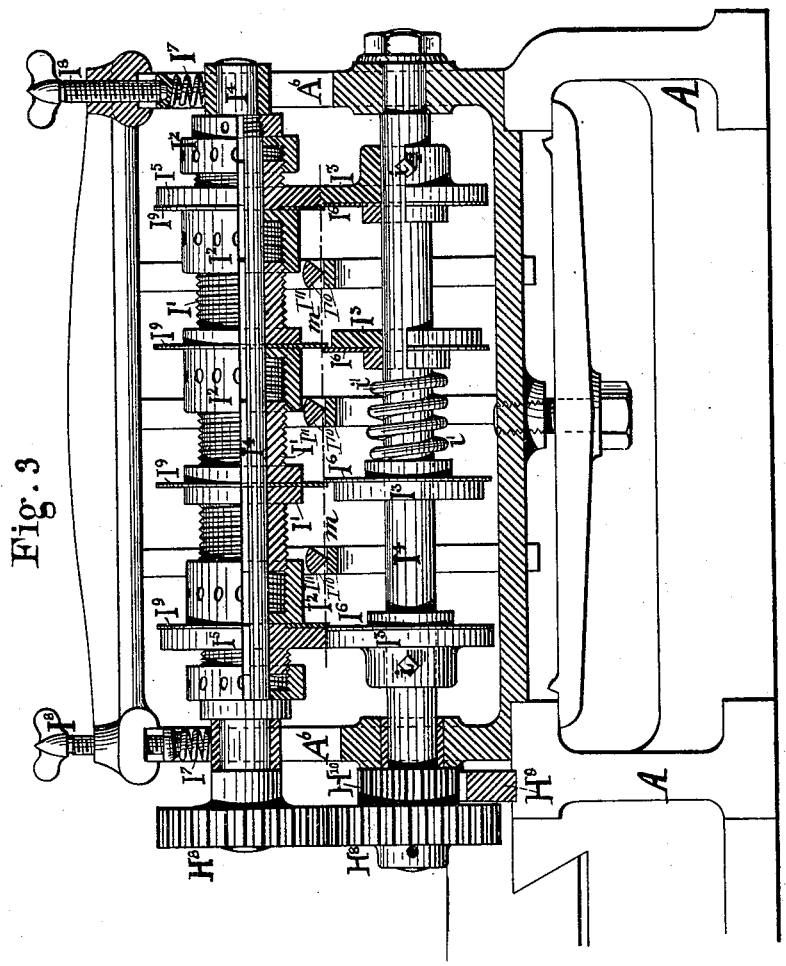

(No Model.)  5 Sheets—Sheet 4.
T. A. BRIGGS.
CUTTER FOR LABEL MACHINES.
No. 262,731.  Patented Aug. 15, 1882.
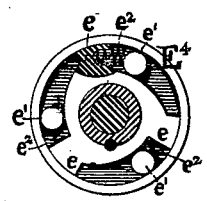
Fig. 7.
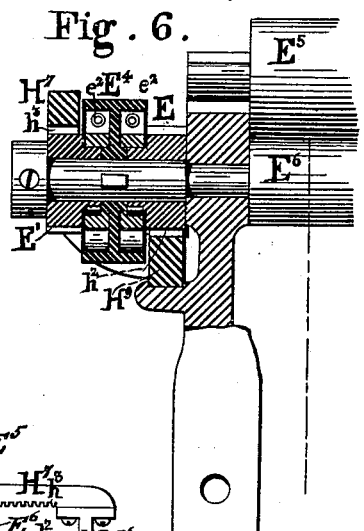
Fig. 6.
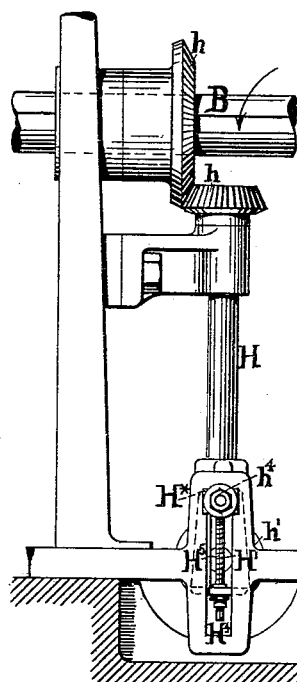
Fig. 5.
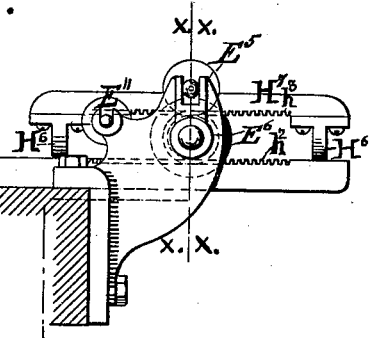
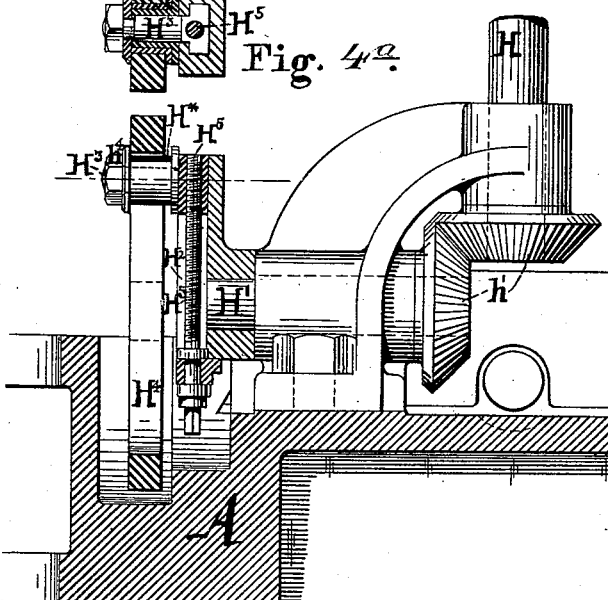
Fig. 4ª.
Fig. 4.
WITNESSES
Charles C. Stetson
B. E. D. Stafford
INVENTOR
Thomas A. Briggs,
by his attorney
P. S. Stetson.
N. PETERS, Photo-Lithographer, Washington, D. C.

(No Model.) 5 Sheets—Sheet 5.

T. A. BRIGGS.
CUTTER FOR LABEL MACHINES.

No. 262,731. Patented Aug. 15, 1882.

WITNESSES
INVENTOR
Thomas A. Briggs
by his attorney
Thomas D. Stetson

United States Patent Office.

THOMAS A. BRIGGS, OF PROVIDENCE, RHODE ISLAND, ASSIGNOR OF TWO-THIRDS TO JOHN B. PERKINS, OF TAUNTON, MASSACHUSETTS, AND FREDERICK TALCOTT, OF ROCKVILLE, CONNECTICUT.

CUTTER FOR LABEL-MACHINES.

SPECIFICATION forming part of Letters Patent No. 262,731, dated August 15, 1882.

Application filed January 20, 1882. (No model.)

*To all whom it may concern:*

Be it known that I, THOMAS A. BRIGGS, of Providence, in the county of Providence and State of Rhode Island, have invented certain new and useful Improvements in Cutters for Label-Machines, by which I mean machines for printing and cutting labels and stamped work; and I do hereby declare that the following is a full and exact description thereof.

I will describe the invention as applied to the printing of small labels of paper. It will be understood that the invention may be also applied to the production of tags and analogous articles on various other materials, as card-board, linen, &c.

The improved machine is of that class in which the material is supplied from a roll mounted in suitable bearings, and is fed forward through the machine step by step, being printed on the way, and ultimately cut into small rectangular pieces, first by being slit by revolving shears into as many separate strips as the work requires, and then divided transversely by the momentary closing of suitable cross-shears. I take hold of the strip of paper by two feeding mechanisms at two widely-separated points, one nearly continuous and the other intermittent; but I operate both by the same adjustable mechanism, so that I can, by a simple and single operation, adjust both feeds with great nicety. I provide unusual facilities for changing the position of the rotary cutters and very firmly holding them to vary the width of the strips to be cut.

The following is a description of what I consider the best means of carrying out the invention.

The accompanying drawings form a part of this specification.

Figure 1:
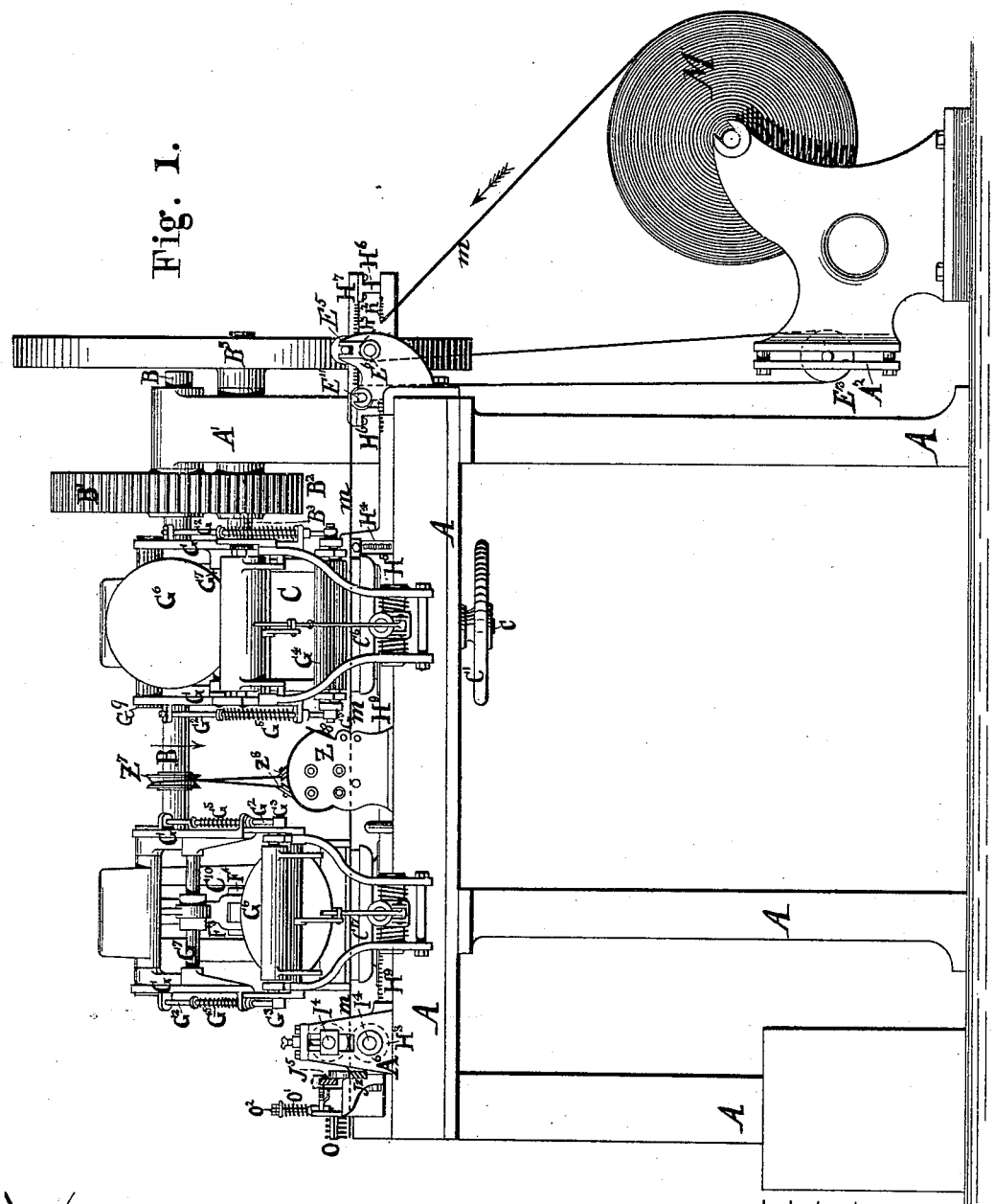
Figure 2:
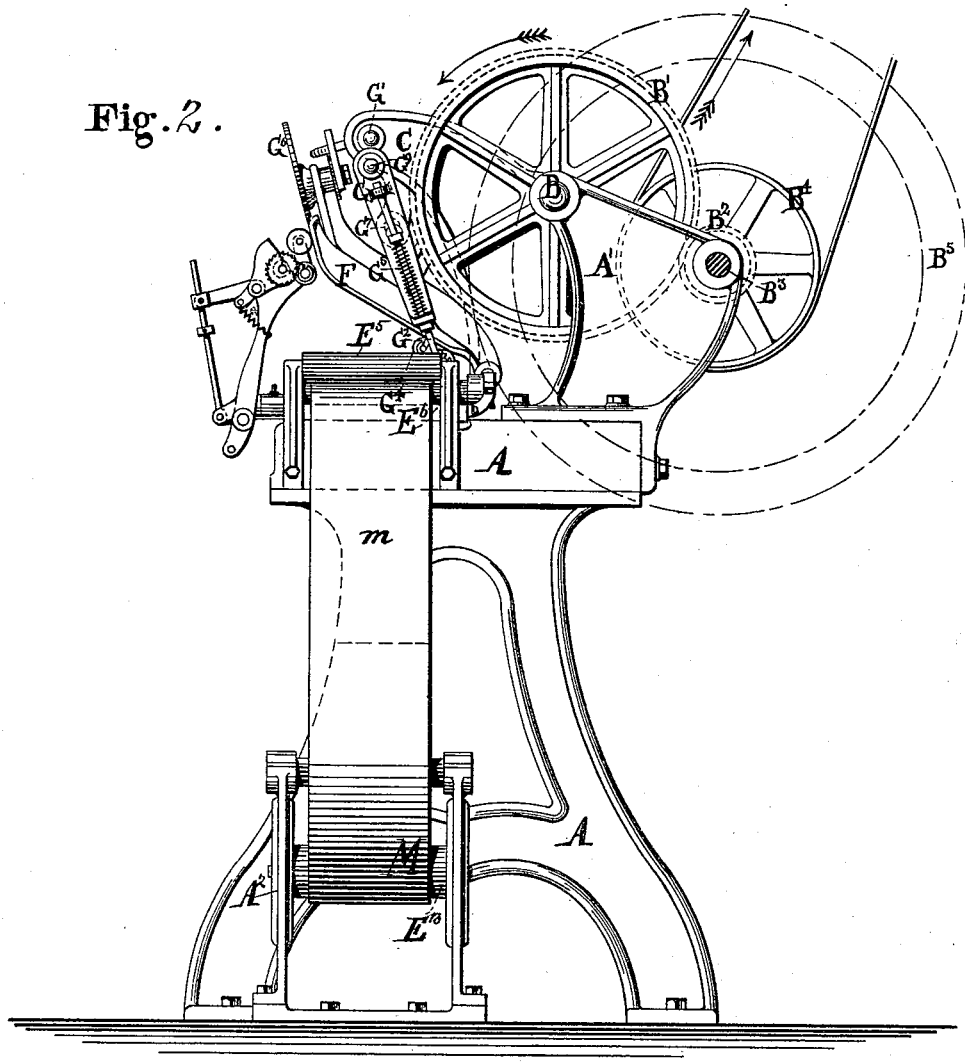
Figure 8:
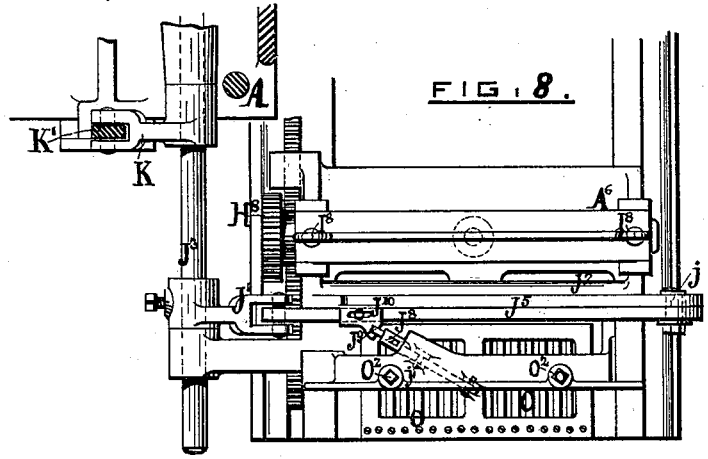
Figure 9:
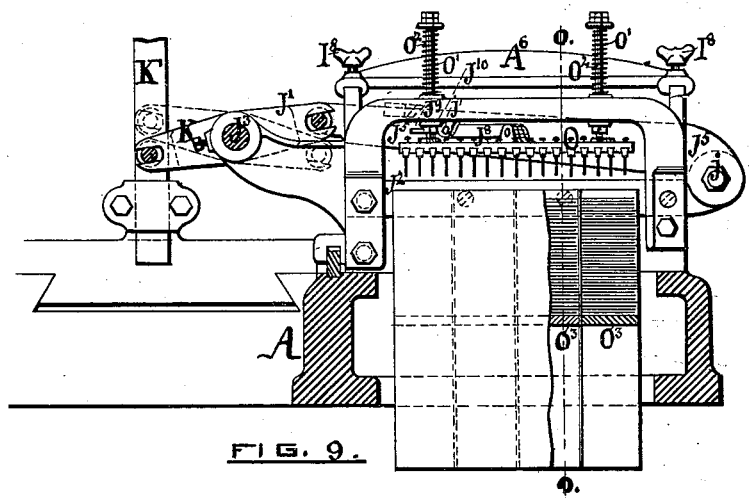
Figure 11:
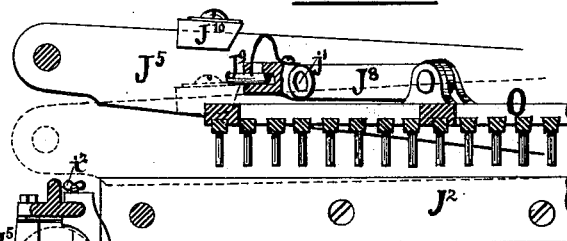
Figure 10:
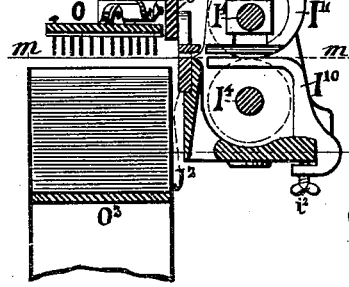

Figure 1 is a side elevation of the machine. Fig. 2 is an end elevation. These figures show the entire machine on a small scale. The remaining figures show portions on a larger scale. Fig. 3 is a vertical section through the longitudinal shearing or slitting mechanism, which is adapted to also serve as the second and intermittent feeding device. Figs. 4, 4$^a$, 5, 6, and 7 are details of the machinery for imparting motion to the feeding mechanism and for adjusting the extent thereof. Fig. 4 is a section through a portion on a plane transverse to the main frame. Fig. 5 is a section at right angles thereto. This view is on a smaller scale than Fig. 4. Fig. 6 is a section through another portion in a plane transverse to the main frame. Fig. 7 shows the provisions for engaging certain wheels shown in Fig. 6. Figs. 8 to 11, inclusive, show the mechanism for transverse shearing and packing the labels. Fig. 8 is a plan view, partly in section. Fig. 9 is an end elevation, partly in section. Fig. 10 is a longitudinal section through certain portions. Fig. 11 is a transverse section through certain portions. The scale of Figs. 8, 9, and 10 is alike. Fig. 11 is on a larger scale.

Similar letters of reference indicate like parts in all the figures where they occur.

A is a fixed frame-work, of cast-iron or other suitable material, portions of which will be indicated, when necessary, by additional letters, as A', A$^2$, &c.

The strip of paper $m$ is delivered from a roll, M, mounted in bearings with liberty to turn. It is led through the first pair of rolls, E$^5$ E$^6$, thence under a drop-roller, E$^{13}$, thence up over a guide-roller, E$^{11}$, and thence over the bed C$^6$ of the first printing-machine. It thence passes, if desired, through the bronzing mechanism, and thence over the bed C$^{17}$ of the second printing-machine, where it is subjected to the second set of impressions. It thence passes between another pair of roller devices, where it is both gripped to aid in the feeding motion and also slit by revolving shears into two or more separate strips. It thence passes over the bed-knife J$^2$, and extends beyond the same to a certain distance, depending on the adjustment of the feeding devices. It stands in this position while a knife, J$^5$, descends with a quick movement and cuts off all the strips transversely. The first printing mechanism can be adjusted backward and forward relatively to the line of travel of the strips of paper. This allows for adapting the machine to printing labels of different dimensions. The mechanism for cutting off the finished labels may be correspondingly set backward and forward. The several members of the machinery by which these several movements are effected are clearly shown in the drawings.

$A^6$ is the housing, which carries the second feeding mechanism and the slitting-knives. These two functions are performed by parts mounted on a single pair of shafts, $I^4 I^4$, geared together by gear-wheels $H^8$. (See Fig. 3.) These shafts carry wheels $I^3 I^5$, which roll in contact, urged together by the springs $I^7$, adjusted by a thumb-screw, $I^8$. These wheels take hold of the paper with sufficient firmness to constitute a reliable feed. Each wheel $I^3 I^5$ carries a circular knife, which, being properly adjusted to work with its mate, constitutes rotary shears, smoothly slitting the paper longitudinally. The lower shaft has these wheels $I^3$ held in position simply by pinching-screws $i$. This construction may be adopted for both rolls $I^3 I^5$, if preferred; but I have devised a different mode, and one which I esteem preferable, shown on the upper roll alone. It consists of a series of threaded thimbles or collars, alternately male and female, with provisions for engaging together and for being turned by a suitable wrench. (Not represented.) The male collars are marked $I'$ and the female $I^2$.

The positions of the annular knives $I^6 I^9$ may be adjusted by turning the threaded collars $I' I^2$ relatively to each other. There should be a sufficient number of these collars of different lengths to adapt the invention to slit the paper into any number of strips or bands required. When the shafts are taken out of their bearings and the end nut removed these collars are readily removed and their places supplied by others of greater or less width. A turning of the collars $I'$ and $I^2$ relatively to each other may increase or diminish the width of any pair, so as to adjust the positions of the rotary cutters with great nicety.

I can realize some of the advantages of the invention by adjusting the rotary cutters on both shafts by such collars. Some of the wheels $I^3$ on the lower shaft, $I^4$, may be thus operated; but I prefer for general practice to thus adjust on one shaft, and to employ rotary cutters on the other shaft differently mounted, so as to be self-adjusting. They are feathered on the shaft, so that they are compelled to turn therewith, but are free to move endwise thereon. They are pressed apart with sufficient force by the spiral spring $i'$ to insure a reliable contact of their edges with the edges of the firmly-set knives $I^9 I^9$, and constitute therewith efficient rotary shears.

$J^2$ is a stationary knife extending squarely across the line of motion of the paper $m$.

$J^5$ is a movable knife swinging in a vertical plane on a pivot, $j$, and adapted to act shearwise with the fixed knife $J^2$ and sever the paper whenever it is depressed.

$J'$ is a lever turning on a center, $J^3$, engaged with the end of the moving knife $J^5$. An arm, K, constituting practically the second arm of the lever $J'$, is operated up and down by a rod, $K'$, carrying a roller actuated by a cam (not shown) on the main shaft B. A momentary elevation of this rod $K'$ at each revolution of the main shaft depresses the knife $J^5$ and severs the paper, thereby setting free one series or line of labels extending across the strip $m$.

The stationary knife $J^2$ and the hinged or movable knife $J^5$, as also certain packing mechanism not necessary to be described, are mounted on the same casting, A, which carries the slitting mechanism, and may be adjusted to the right or left, so as to act at the required distance from the printing, according as the size of the labels printed shall require.

$I^{10} I^{10}$ are guide-fingers, curved as shown, and provided each with a clamping-screw, $i^2$, by which it can be set in any required position on the corresponding fixed frame-work. They are arranged to support the paper in an approximately plane condition as it passes through the rotary shears. The guides $I^{10}$ are the lower ones, on which the under side of the paper, which is usually not printed, rests. The upper guides, $I^{11}$, are V-shaped and have the sharp edges underneath, and thus present a very narrow bearing on the upper side of the paper, which is usually printed, and do not blur the ink. These guides $I^{10} I^{11}$ extend through between the rolls and guide the paper directly to the cross-cutting knives $J^2 J^5$, where it is shorn off transversely and guided to the packing device.

It will now be seen that the machine draws the paper $m$ with a nearly constant motion from the roll M. The drop-roll $E^{13}$ takes up the slack which accumulates during the periods while the paper in its subsequent passage through the machine is at rest. The feed-rolls $I^3 I^5$, worked intermittently, draw the paper forward step by step to an exactly-determined extent, and then allow it to rest absolutely still for a sufficient period to allow the successive printings and the transverse cutting and packing. The first printing mechanism prints a portion of the impression, and the second printing operation effects the remainder of the printing required. The slitting-cutters $I^6 I^9$ divide the strips of paper longitudinally into as many separate strips as the size and number of labels being printed require, the slits being always made along the spaces between the several labels, the paper being held in the proper place by the fingers $I^{10}$. The transverse shears $J^2 J^5$ cut squarely across the entire series, this cut also being always made in the blank space between one label and the next. The packer strikes gently on the upper faces of the several labels and packs them down upon the piles previously finished.

I can use different-colored inks in the two printing mechanisms. Such will produce labels in two colors if the two impressions are arranged to be made on a portion of each label. When labels all one color are required I can work twice as fast, printing the several labels in alternate positions on the paper, and operating the transverse shears J² J⁵ twice instead of once for each revolution of the main shaft. The slitting-knives are adjusted so as to remove a portion at both edges of the strip of paper, which edge-strips will be wasted. I conduct the waste strips up over the upper knife, so that this waste material is discharged in the form of long uncut strips.

The intermediate rotary shears may be distributed between the edging-shears at any required position, and may be introduced in any number, so as to divide the strip of paper which is fed through the machine into as many separate strips as may be required. I attach much importance to this feature, irrespective of the provisions by which these shears automatically adjust themselves to each other by springs, &c. The fact of the shearing longitudinally along one or more lines between the edging-shears, by enabling me to make two or more separate lines of labels, or other small work at the same time, promotes the rapidity and economy with which large orders of this kind may be executed.

It will be observed that the feeding-rolls I³ I⁵ are placed exterior to the accompanying longitudinal shearing-cutters I⁶ I⁹, so that the grip of the parts I³ I⁵ is upon the edge paper, which is waste, and not upon the surfaces of the label. This arrangement requires for the successful working a sufficient amount of waste at each edge to allow a firm hold of the feeding-rollers I³ I⁵ thereon. Care should be taken to provide paper sufficiently wider than the finished labels to allow therefor. A marked advantage from this arrangement is that the printing types or analogous printing-surfaces may be of such width as to cover the entire label clear up to the line of action of the edging-shears. This could not be without smearing if the feeding-rollers were arranged on the opposite or inner side of the shears.

The printing and feed mechanisms and the packing device form no part of this patent, the same having been made the subject-matter of a separate application for patent by me filed on the 6th day of October, 1881, serial No. 43,334.

I claim as an improvement in machines for producing labels and analogous works—

1. The adjustable collars I' I², formed in separate pieces, engaged together by screw-threads, as shown, in combination with the rotary cutters I⁶ I⁹ and with the shaft of a rotary shears, as herein specified.

2. The adjustable guide-fingers I¹⁰ and I¹¹, the former lying beneath and supporting the paper, and the latter formed with a sharp edge, which rests upon the upper surface of the paper, in combination with the pair of rotary knives I⁶ I⁹, and adapted to support the paper along narrow lines and hold it in a plane condition during the slitting and cross-cutting, as herein specified.

3. The feeding-rolls I³ I⁵, mounted on the same shaft as the longitudinal shearing means I⁶ I⁹, and arranged outside of the line of the shears, as shown, whereby the feeding is wholly done by said rolls acting on the waste paper at the edges of the strip, substantially as set forth.

In testimony whereof I have hereunto set my hand at New York city, N. Y., this 19th day of January, 1882, in the presence of two subscribing witnesses.

THOMAS A. BRIGGS.

Witnesses:
M. F. BOYLE,
CHARLES C. STETSON.